United States Patent [19]

Geerlings

[11] Patent Number: 4,739,224
[45] Date of Patent: Apr. 19, 1988

[54] LIGHT CONTROL CIRCUIT

[75] Inventor: Steven L. Geerlings, Zeeland, Mich.

[73] Assignee: Prince Corporation, Holland, Mich.

[21] Appl. No.: 841,560

[22] Filed: Mar. 20, 1986

[51] Int. Cl.$^4$ .............................................. B60Q 7/00
[52] U.S. Cl. ........................................ 315/84; 315/82; 315/83; 307/10 LS; 307/10 R
[58] Field of Search ................... 315/84, 83, 82, 191, 315/76, 77; 307/10 LS, 10 R

[56] References Cited

U.S. PATENT DOCUMENTS

| | | | |
|---|---|---|---|
| 3,145,322 | 8/1964 | Yazigi | 315/82 |
| 3,321,663 | 5/1967 | Poznik | 315/84 |
| 3,348,095 | 10/1967 | Gold | 315/82 |
| 3,467,831 | 9/1969 | Wilson et al. | 315/84 |
| 3,530,333 | 9/1970 | Roberts | 315/84 |
| 3,611,011 | 10/1971 | Postula | 315/84 |
| 3,818,267 | 6/1974 | Hill et al. | 315/82 |
| 4,301,390 | 11/1981 | Earle | 315/82 |

Primary Examiner—David K. Moore
Assistant Examiner—Michael Razavi
Attorney, Agent, or Firm—Price, Heneveld, Cooper, DeWitt & Litton

[57] ABSTRACT

A light control circuit includes a latching circuit actuated by a manually actuated switch to, in turn, activate a solid-state switch coupled to supply power to one or more lamps. The latching circuit is reset by a diode coupled to the door actuated switches such that in the event the interior lamp or lamps are manually operated and a door subsequently opened, the lamps will be extinguished upon the closing of the door regardless of the prior manual activation of the lamps.

6 Claims, 1 Drawing Sheet

LIGHT CONTROL CIRCUIT

BACKGROUND OF THE INVENTION

The present invention pertains to a light control circuit and particularly one for use in controlling the interior lights of a vehicle.

Typically, vehicles have a variety of lights for providing interior lighting to a vehicle either upon ingress and egress or for illuminating the interior of the vehicle temporarily for, as an example, reading a map, toll card, etc. Typically, these lights are operated by switches associated with the vehicle doors or alternatively by a separate manual switch located on the dashboard or near the light itself.

On occasion, a vehicle occupant will manually activate the courtesy lights when parking to find an article to be removed from the vehicle, write something down or perform some other function which requires additional interior ilumination. When the doors are opened, however, the lights will be on and the conditioning of this expected condition frequently prevents the vehicle operator or occupant from remembering to turn off the manual switch. Thus, the operator can close the vehicle door and the interior lighting remains on, frequently unnoticed. This can, in a relatively short period of time, either partially or totally discharge the battery causing significant inconvenience.

SUMMARY OF THE PRESENT INVENTION

The light control circuit of the present invention combines a prior art light activating circuit including a latching circuit having a pair of series-coupled inverters with a new latch resetting circuit. The latching circuit is actuated by a manually actuated switch to, in turn, activate a solid-state switch coupled to supply power to one or more lamps. The light control circuit of the present invention couples this circuit and the door actuated switches such that in the event the interior lamp or lamps are manually operated and a door subsequently opened, the latching circuit is reset and the lamps will be extinguished upon the closing of the door regardless of the prior manual activation of the lamps.

In a preferred embodiment of the present invention, the light control circuit includes a unidirectional conductive device having one terminal coupled to a reset terminal of a latching circuit and a second terminal coupled to a door actuated switch such that the activation of the door actuated switch resets the latching circuit from its previously latched on position to the off position.

These and other features, objects and advantages of the present invention will become apparent upon reading the following description thereof together with reference to the accompanying drawings in which:

DETAILED DESCRIPTION OF THE PREFERRED EMBODIMENT

Figure 1:
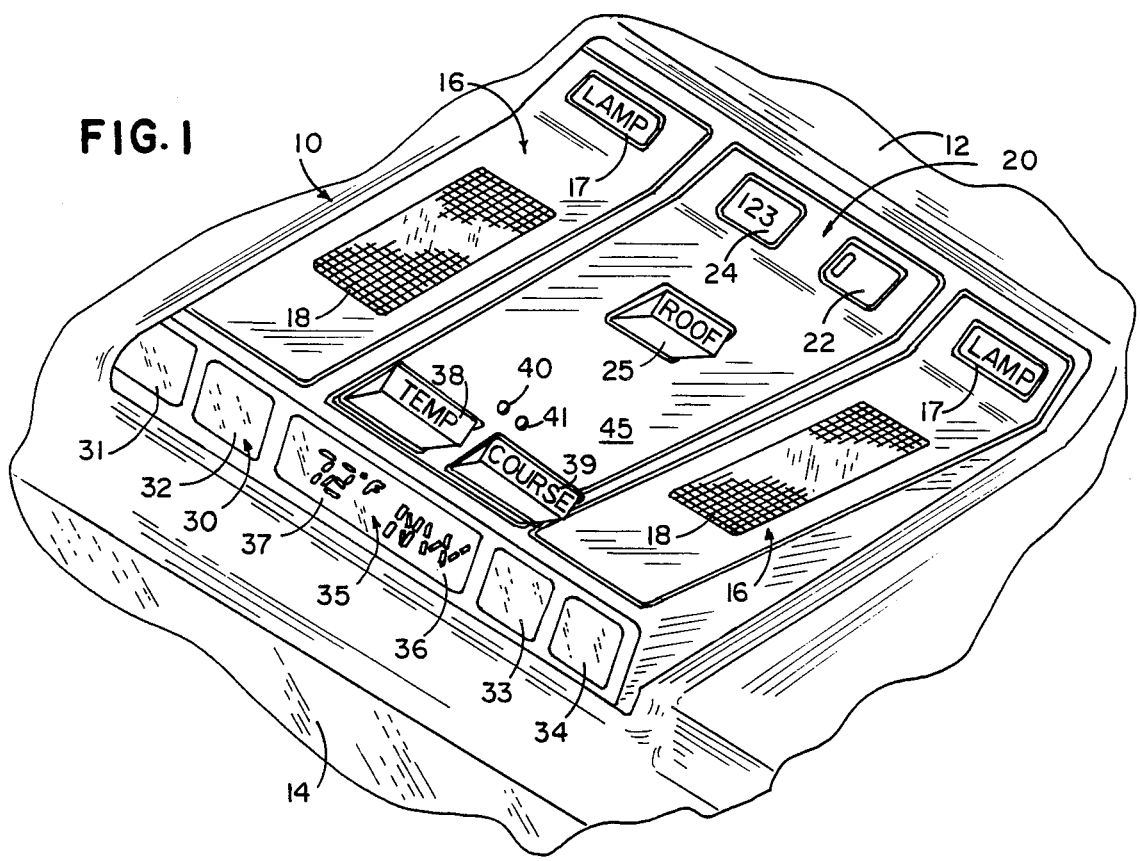
FIG. 1 is fragmentary perspective view of a lamp module including the system of the present invention.

Referring initially to FIG. 1, there is shown a lamp moduel 10 which is installed in the vehicle during manufacturing although it could be separately added at a later time. Module 10 is attached to the roof 12 of a vehicle and centered near the top edge of windshield 14 typically just above the rearview mirror. The module includes a pair of map reading lamps 16 each having an associated soft touch switch 17 for the manual operation of lamps 19 and 19' (FIG. 2) which are positioned behind lenses 18 and which direct illumination into the lap area of either the driver or passenger side of the vehicle depending on which switch is actuated. The center of module 10 includes a garage door opening transmitter 20 including a three-position switch 22 or actuating any one of three different garage units by the actuation of push-button switch 24. Module 10 may also include an electrical sunroof control switch 25 if the vehicle is so equipped. The construction of the garage door transmitter module 20 is disclosed in detail in U.S. Pat. No. 4,241,870 issued Dec. 30, 1980, and assigned to the present assignee.

Module 10 additionally includes a separate display panel 30 which includes display indicators 31–34 for displaying vehicle operating parameters such as engine temperature, oil pressure, generator or fuel warning or the like, information which can either be displayed in a digital alpha-numeric format or as warning lights. The center of display module 30 includes a digital display 35 providing, in one embodiment, an octant display 36 of the vehicle heading in alpha format. The left side of display 35 includes a temperature display 37 providing a selectable Fahrenheit or Centigrade display of the exterior ambient temperature of the air as well as a warning signal when road conditions approach freezing. The temperature display circuit is actuated by a push-button temperature switch 38 while the compass circuit is actuated by a push-button switch 39. A pair of apertures 40 and 41 provide limited access to calibrate and compensation switches which are only occasionally used for the calibration of the compass. The compass system is disclosed in greater detail in U.S. Pat. No. 4,546,551 issued Oct. 18, 1985, and assigned to the present assignee. A pair of the electrical control circuits 60 (FIG. 2) of the present invention are also positioned within the module 10 to control lamps 19 and 19' behind lenses 18 and is disclosed in detail in FIG. 2 now described.

Figure 2:
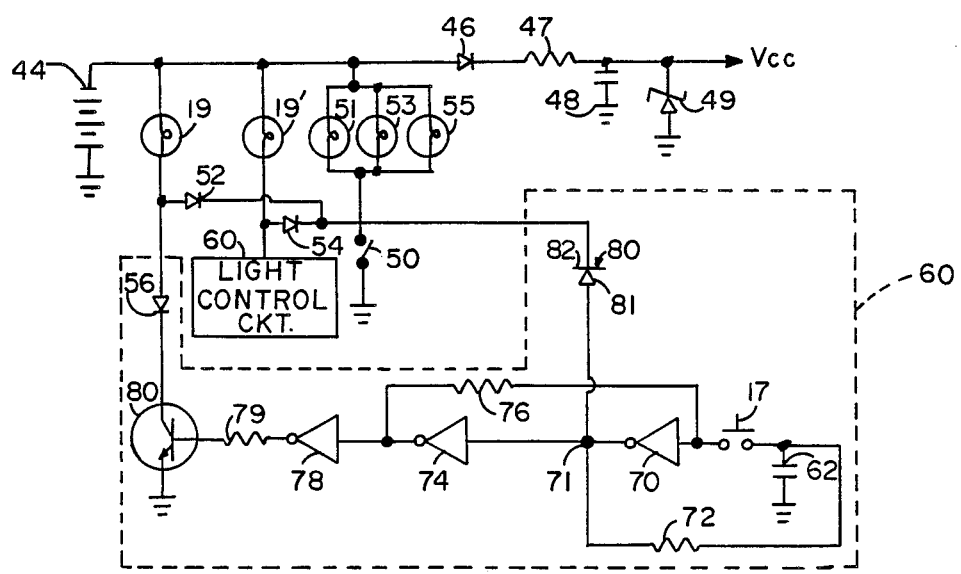
FIG. 2 is an electrical circuit diagram in block and schematic form of an electrical circuit embodying the present invention.

As seen in FIG. 2, the vehicle's power supply is represented by battery 44 typically a 12-volt battery having its negative terminal coupled to the vehicle chassis forming system ground as shown in the figure. The system also provides $V_{cc}$ to operate the latching circuit components by a filter including half wave rectifier 46, resistor 47, filter capacitor 48 and Zener regulation diode 49. The interconnection of the solid-state inverters, described below, to $V_{cc}$ and ground is conventional and not shown in detail. Each of the lamps 19 and 19' associated with lenses 18, shown in FIG. 1, can be turned on manually by one of the door operated switches 50 with one such switch being shown as representative of the door switches which are coupled in parallel.

Lamps 19 and 19' each have one terminal coupled to the vehicle power supply 44 and an opposite terminal coupled to switch 50 by means of a current steering or isolation diode 52 and 54, respectively. Thus, with switch(s) 50 closed by the opening of one or more of the doors of the vehicle, the lamps 19 and 19' will be illuminated, directing illumination through lenses 18 to the interior of the vehicle. The closure of one of the switches 50 by opening a door also can activate a plurality of other courtesy lights 51, 53, and 55, shown in FIG. 2, which may, for example, be lights mounted in the door panels, an overhead dome light or the like. These remaining lamps 51, 53 and 55 have one terminal coupled directly to the power supply 44 through the system's wiring harness and the remaining terminal coupled to switches 50 which when closed completes the circuit for electrical current through the lamps for providing illumination therefrom. Lamps 19 and 19' are also each additionally coupled to a light controlling circuit 60 of the present invention by means of an isolation diode 56. Circuit 60 associated with lamp 19' together with its associated isolation diode is shown in block form in FIG. 2 with the identical circuit 60 associated with lamp 19 being shown in schematic form.

The light control circuit 60 includes a spring-loaded momentary push-button switch 17 having a very light control touch for actuation. One terminal of switch 17 is coupled to ground through a capacitor 62 which, in the preferred embodiment, is a 0.1 Mfd capacitor. The remaining terminal of the shorting-type switch is coupled to an input terminal of a first inverter 70 having an output terminal coupled to capacitor 62 by a feeback resistor having, in the preferred embodiment, a value of 100K-Ohms. The output terminal of inverter 70 is coupled to the input terminal of a second inverter 74 whose output terminal is coupled to the input terminal of inverter 70 by a feedback resistor 76 having a value of 10K-Ohms in the preferred embodiment. The junction 71 of inverters 70 and 74 defines a reset terminal for the latching circuit including circuit elements 62, 70, 72, 74 and 76.

The output terminal of inverter 74 is also coupled to a third inverter 78 having its output coupled to the base terminal of an NPN transistor 80 via a serial resistor 79. Inverter 70 and 74, together with the associated resistors and capacitor 62, form a latching circuit which, upon alternate actuations of push-button switch 17, provide a signal to the base of NPN transistor 80 which renders it conductive to activate lamp 19 through a current flow path including steering diode 56 and the collector-to-emitter current path through transistor 80 and shut off the solid-state switch constituting transistor 80 upon the second actuation of switch 17. Reset circuit means comprising a unidirectional conductive device such as a diode 80 is coupled from reset terminal 71 of the latching circuit to switch 50. The anode 81 of diode 8 is coupled to terminal 71 while its cathode 82 is coupled to switch 50. The reset circuit will reset the latching circuit if in a latched-on condition upon the subsequent actuation of switch 50 as described below. Having described the circuit construction, a description of the operation of the circuit to provide the desired light controlling function is now presented.

OPERATION

To best understand the operation of the circuit, an initial condition is assumed where, for example, the map lamp 19 is extinguished and the vehicle doors are closed. In this condition, switch 17 is open, as shown in FIG. 2, and the input to inverter 70 is therefore at a logic high or "1" level providing a low or logic "0" output signal at terminal 71 and the input of inverter 74 which in turn applies a logic "1" to the input of inverter 78. The output of inverter 78 is therefore low and the solid-state switch comprising transistor 80 is turned off. Thus, lamp 19 is extinguished. If during this time, a door is opened, switch 50 will be closed to activate lamp 19 through diode 52; however, the low at the output of inverter 70 and at the anode of diode 80 will not change the initial conditioned state of circuit 60. At this point, it is noted that the low on the output of amplifier 70 causes capacitor 62 to discharge through the relatively high time constant of the 100K-Ohm resistor 72 and, therefore, capacitor 62 is discharged, i.e., at a logic "0" level.

Assuming next that the vehicle operator would like to illuminate lamp 19 and thereby pushes switch 17, the pushing of switch 17 provides a momentary low to the input of inverter 70 since capacitor 62 is discharged causing the inverter to reverse its output state as does inverter 74 which now has a low output state which is applied back to inverter 70 through resistor 76 latching the inverters in the new output states. Inverter 78 now has a low or logic "0" signal applied to its input and a logic "1" output signal (typically equal or near to $V_{cc}$) which when applied to the base of transistor 80 renders it conductive to provide a current flow path from battery 44 through lamp 19, diode 56 and transistor 80 to ground thereby illuminating the lamp 19.

Switch 17 will normally be only momentarily depressed; however, if it remains pushed for any length of time, resistor 76 assures that the latch circuit including inverters 70 and 74 maintain their latched condition rendering transistor 80 conductive. Upon release of switch 17 back to the position illustrated in FIG. 2, capacitor 62 will now begin slowly charging through resistor 62 with a posititive charge provided by the now logic "1" output of inverter 70. Thus, once the operator has manually actuated switch 17, lamp 19 will remain on until switch is again actuated, in which case a positive signal is applied to inverter 70 from the now charged capacitor 62 which reverses the output signals on each of the inverters 70, 74 and 78 and turns transistor 80 off thereby extinguishing lamp 19. Again, resistor 76 will feed a positive signal back to the input of inverter 70 upon such occurrence to latch the circuit into the intial conditioned state even when switch 17 is released which then again provides for the slow discharge of capacitor 62.

If, however, while lamp 19 is illuminated by the manual actuation of switch 17 and thereby the input of inverter 70 has a negative signal applied thereto with a positive output signal, which is the quiescent condition upon manual activation of lamp 19 through push-button switch 17, as described above, and the vehicle is parked with the courtesy light on, reset diode 80 prevents the courtesy light from remaining on upon exit from the vehicle. If this occurs, the output of inverter 70 in this state is at a positive logic "1" level which is applied to the anode 81 of diode 80 having its cathode coupled to switch 50. Upon exiting the vehicle, switch 50 will be momentarily closed illuminating the normal courtesy lights 51, 53 and 55 as well as providing a current flow path through the map lamps 19 and 19' through diodes 52 and 54. At the same time, however, the coupling to ground of cathode 82 of diode 80 renders it conductive, thereby providing a low logic "0" signal to the input of inverter 74 causing it to reverse states providing now a high output signal which is fed back to the input of inverter 70 through feedback resistor 76 latching the latching circuit in the lamp-off position with transistor 80 off. Upon subsequent closure of the door, therefore, and the opening of switch 50, transistor 80 will remain non-conductive and lamp 19 will thereby be extinguished.

Thus, with the system of the present invention, in the event an overhead lamp such as a map reading lamp 19 or 19' or other courtesy lamp, including the light control circuit 60 of the present invention is manually actuated and left on while the vehicle door opens and remaining courtesy lights are illuminated, the manually actuated lamp will be extinguished upon the subsequent closure of the door which normally extinguishes the remaining lights. This circuit thereby provides protection against the undesired discharge of a battery due to the inadvertent continued activation of a manually activated lamp. As seen in FIG. 2, several circuits 60, each including a resetting diode 80, may be employed in the vehicle.

It will become apparent to those skilled in the art that various modifications to the preferred embodiment of the invention can be made without departing from the spirit or scope thereof as defined by the appended claims.

The embodiments of the invention in which an exclusive property or privilege is claimed are defined as follows:

1. An interior light control circuit for a vehicle comprising:
    at least one interior vehicle light;
    first circuit means coupled to said vehicle interior light and including first manually actuated switch means for providing current for illuminating said vehicle interior light comprises a latching circuit responsive to the momentary actuation of said first switch means for changing states and a solid-state switch coupled to said light and a power source and responsive to an output of said latching circuit to provide a current path through said light;
    door actuated switch means coupled to said vehicle interior light for providing current for illuminating said light when an associated door is opened;
    second circuit means includes means for resetting said latching circuit comprising an unidirectional conductive device coupled between said latching circuit and said door actuated switch means for detecting when said light is actuated by said first switch means and responsive to the subsequent actuation of said door actuated switch means by the opening of a door to provide a signal applied to said first circuit means to cause said first circuit means to terminate current to said light to turn said light off when said door actuated switch is subsequently actuated by the closure of said door even though said manually actuated switch has been actuated to illuminate said vehicle interior light.

2. The control circuit as defined in claim 1 wherein said unidirectional conductive device comprises a diode having an anode coupled to said latching circuit and a cathode coupled to said door actuated switch.

3. An electrical control circuit for a vehicle interior light comprising:
    a source of electrical power;
    a lamp for providing illumination to the vehicle interior;
    a solid-state switch for selectively coupling said lamp to said source;
    at least one switch coupled to said lamp and actuated by a vehicle door for coupling said lamp to said source when the door is opened;
    a manually actuated switch for the manual activation of said lamp;
    a latching circuit including a reset terminal, said latching circuit coupled to said manually actuated switch and to said solid-state switch for controlling the conductive state of said solid-state switch in response to the operation of said manually actuated switch; and
    a unidirectional conductive device coupled to said reset terminal of said latching circuit to said door actuated switch such that said latching circuit will be reset to turn said solid-state switch off in the event it is in a conductive state and said door operated switch is closed by the momentary opening and subsequent closing of the vehicle door.

4. The circuit as defined in claim 3 wherein said unidirectional conductive device is a diode.

5. The circuit as defined in claim 4 wherein said diode has an anode coupled to said reset terminal of said latching circuit and a cathode coupled to said door actuated switch.

6. The circuit as defined in claim 5 wherein a plurality of interior lamps are provided and each includes an associated latching circuit and manual switch means and wherein a diode is coupled from the reset terminal of each latching circuit to said door actuated switch.

* * * * *